United States Patent Office 3,166,753
Patented Jan. 19, 1965

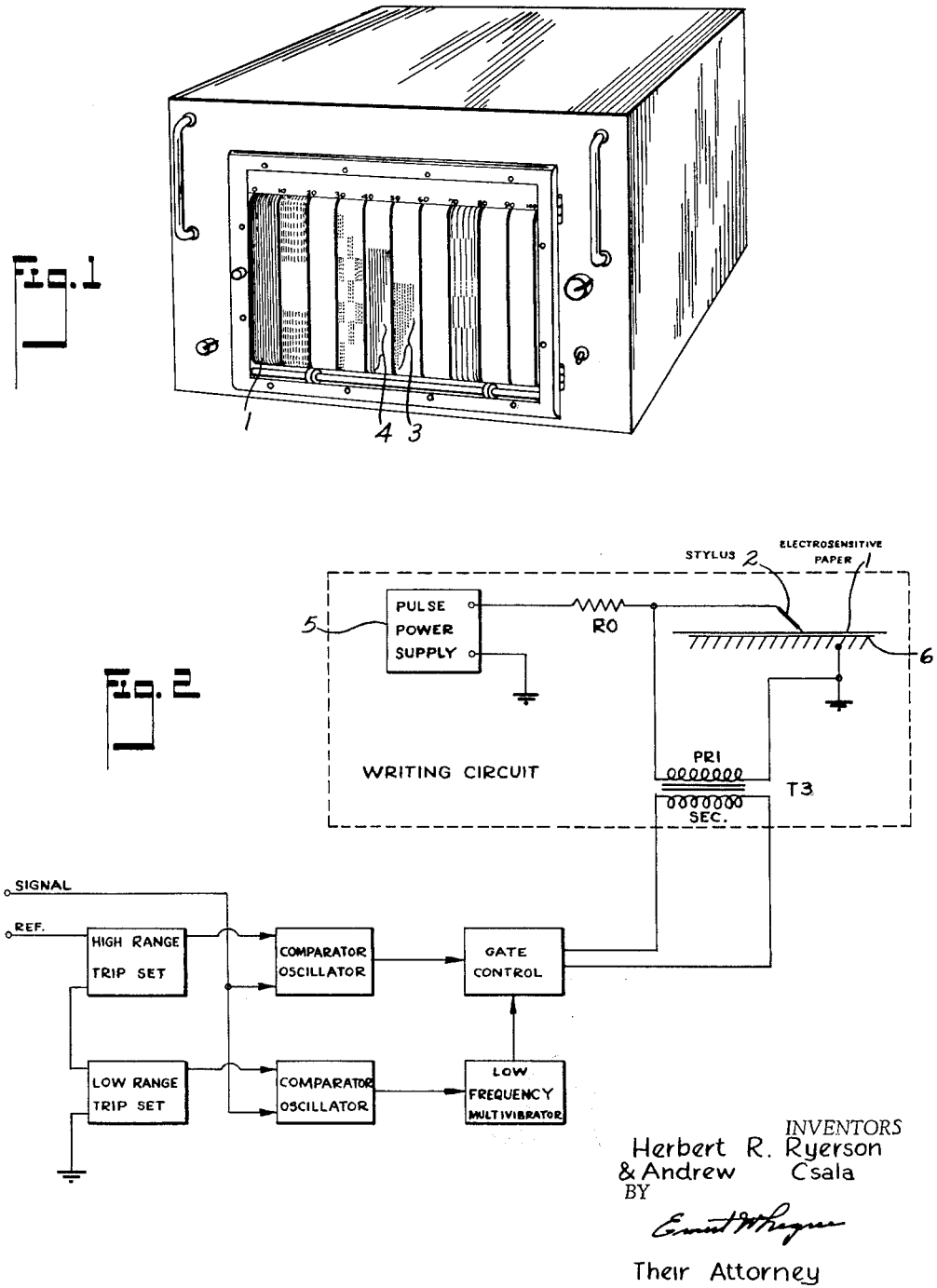

3,166,753
MONITOR CONTROL CIRCUIT
Herbert R. Ryerson, Garfield Heights, and Andrew Csala, Cleveland, Ohio, assignors to Avtron Manufacturing, Inc., a corporation of Ohio
Filed Jan. 31, 1961, Ser. No. 86,224
12 Claims. (Cl. 346—74)

This invention relates to a monitor control circuit for controlling the operation of event recorders. The circuit is particularly suitable for use with high speed multi-channel event recorders which write with styli by means of electric current on electrosensitive paper.

Event recorders, sometimes known as operations monitors, are instruments which record the order of occurrence, duration and time-relationships of a number of events or operations. Typical uses might be a study of the sequencing of relays, valves, controls, motors and pumps in a fluid control system, or an analysis of the performance of prototypes, or a survey of operations within a plant by a record of starts and stops of several production machines. In the type of event recorder with which the invention is more particularly concerned, each information channel is recorded by a non-moving metal stylus which remains in contact with the paper. Two states or conditions only may be recorded on any one channel, such as YES-NO, or ON-OFF; that is, each stylus either writes or does not write. The corresponding indication on the chart is a solid line in the space allotted to the channel over the time interval of an input signal, or a blank space in the absence of a signal.

It has been found that many operations do not lend themselves readily to a simple ON-OFF type of record. Frequently it is desired to observe levels of intensity or rates of performance and to have a permanent record of same on the chart. Therefore the general object of the invention is to increase the versatility and recording capabilities of event recorders.

A more specific object of the invention is to provide a monitor control circuit for an event recorder of the kind in question which will cause the stylus to write only in the event that the input signal attains or exceeds a precise preset level.

Another specific object is to provide a monitor control circuit which will cause the stylus to write in one fashion when the input signal attains one preset level, and in another fashion when it attains a higher preset level. According to a feature of the invention, depending upon the exact magnitude of the input signal, the stylus of the event recorder either does not write, or writes a dotted line, or writes a solid line upon the electro-sensitive chart paper.

In accordance with the invention, the input signal to be monitored is supplied to a voltage comparator which provides an output only when the input signal voltage exceeds a preset level which may be adjusted at will. A suitable form of comparator is a blocking oscillator formed by an electron discharge device provided with a feedback loop between output and input, for instance a transistor with transformer coupling between collector and base circuits. The feedback loop is arranged to provide negative feedback when the input signal voltage is less than a preset trip voltage, and positive feedback when the signal voltage exceeds the trip voltage. The occurrence of positive feedback causes the blocking oscillator to go into oscillation, and this happens at a precisely determined level of input signal voltage. The output of the blocking oscillator is used to turn on a gate circuit which causes the stylus of the event recorder to write.

In a preferred embodiment of the invention, the monitor control comprises two comparators to each of which the input signal consisting of a D.C. voltage, and an adjustable reference voltage are supplied. One comparator is adjustable to go into oscillation in a low range of input signal, and the other in a high range of input signal. When the low range comparator goes into oscillation, it turns on a low frequency multivibrator which in turn intermittently operates a gate control causing the stylus to write a dotted line on the chart. When the high range comparator goes into oscillation, it operates the gate control continuously and causes the stylus to write a solid line.

Additional features and advantages of the invention will appear from the detailed description to follow of a monitor control module embodying the invention and the accompanying drawings illustrating same. The features of the invention believed to be novel will be particularly pointed out in the appended claims.

In the drawings:

FIG. 1 is a pictorial view of an event recorder typical of the kind with which the monitor control module of the present invention is intended to be used.

FIG. 2 illustrates in schematic form one writing channel with stylus of the event recorder, and in block form, the monitor control system therefor of the present invention.

Figure 3:
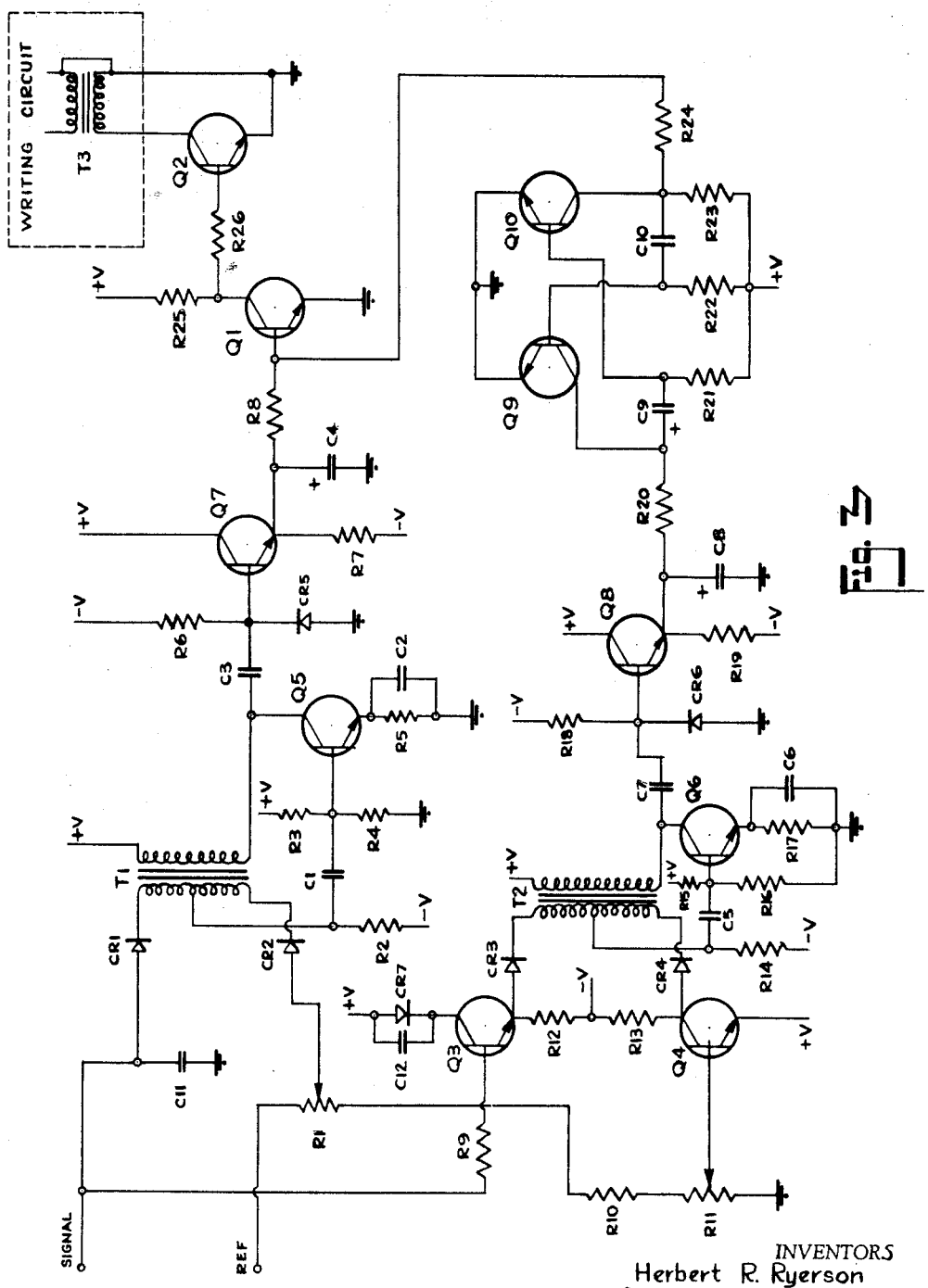
FIG. 3 is a schematic circuit diagram of the monitor control system or module embodying the invention.

Referring to FIG. 1, there is shown a commercially available type of event recorder or operations monitor. The instrument is a rack mounted type and records 100 channels of sequential or operational information on a moving chart 1 of electrosensitive paper. Writing is by means of stationary metal styli, one being indicated at 2 in FIG. 2, which remains in contact with the electrosensitive paper. The paper is caused to move under the styli at regulated speed by a suitable drive mechanism in known fashion. There is one stylus for each channel and 100 parallel lines may appear on the chart, lateraly spaced in groups of 10 for ease of identification. As available heretofore, such an instrument could only record ON-OFF input data. According to a feature of the present invention, the instrument wil record OFF data by the absence of a line, ON data according to an input signal attaining a first level by a dotted line as indicated at 3, and ON data according to an input signal attaining a second level by a solid line as indicated at 4. Of course, in addition to the indication of levels of input signals, the chart also indicates in the usual fashion the duration and mutual time relationship of the recorded events.

The writing circuit for one stylus is shown in FIG. 2. A pulse power supply indicated at 5, which may be common to all channels, supplies pulses of 100 microseconds duration and 500 volts peak to the stylus 2 through a current limiting resistor R0, the return path being through a metal plate 6 which backs up the electrosensitive paper 1 and through ground. To control the writing of the stylus, a transformer T3 has its primary connected in shunt with the stylus and paper. The inductance of the primary is sufficient that when the secondary is open, the stylus produces a good readable trace. However when the secondary is short-circuited, the load reflected by the primary in shunt with the stylus and paper by-passes the pulses to the extent that the stylus does not write. In the event recorders heretofore available, it was intended that a suitable low voltage device be connected across the secondary of transformer T3 to control the writing of the stylus, for instance a relay or a transistor with appropriate circuitry for causing the input signal to turn it on.

The invention provides instead a monitor control circuit which is connected across the secondary winding terminals of transformer T3 in the same fashion, but which achieves greatly increased accuracy and versatility. As indicated in FIG. 2, the preferred embodiment of the monitor control circuit comprises a low range comparator oscillator and a high range comparator oscillator to both of which the input signal is supplied. A reference voltage, suitably 28 volts D.C., is supplied to a voltage divider network including a pair of adjustable potentiometers, one for each range. The potentiometers are preset as desired to determine the trip voltage within each range, suitably from 0 to 2.5 volts for the low range, and from 23 to 28 volts for the high range. When an input signal exceeds the low range trip voltage, e.g. 1.5 volts, the low range comparator oscillator goes into oscillation, the low frequency multivibrator is turned on, and the gate control is turned on intermittently at the low frequency of the multivibrator, e.g. 10 c.p.s. This causes the stylus to write a dotted line. However if the input signal exceeds the high range trip voltage, e.g. 25 volts, the high range comparator oscillator also goes into oscillation and provides an overriding signal to the gate control which turns it on continuously. The stylus then writes a solid line.

Referring to FIG. 3, the monitor control circuit utilizes transistors for the active components. According to the conventional representation utilized, the base is indicated by the straight line, and emitter and collector by angled lines, that bearing the arrowhead being the emitter and and the arrow indicating the direction of conventional current flow (opposite to electron flow). The illustrated embodiment utilizes NPN transistors but obviously PNP transistors could equally well be used with suitable reversal of polarities. The symbols +V and —V indicate connections to sources of +14 and —14 volts D.C. respectively, and the reference voltage is 28 volts.

The low range comparator oscillator comprises transistor Q6 connected as a blocking oscillator with transformer T2 included in its feedback loop, the circuitry including also resistors R14, R15, R16, R17 and capacitors C5 and C6. The reference voltage is applied to the base of transistor Q4 through a voltage divider comprising potentiometer R1, resistor R10 and potentiometer R11 connected in series. Potentiometer R11 is adjustable to preset the trip voltage for the low voltage comparator. The input signal voltage is applied to the base of transistor Q3 through resistor R9. Transistors Q4 and Q3, by reason of resistors R13 and R12 in their respective emitter circuits, operate as emitter followers and repeat at their emitter terminals the voltages applied to their bases. The function of transistors Q4 and Q3 is to decrease the source impedance presented to diodes or crystal rectifiers CR4 and CR3 to which their outputs are supplied, and the balanced configuration is for the purpose of achieving temperature compensation.

The mode of operation of the low range comparator oscillator is as follows. The feedback from the collector to the base of transistor Q6 occurs through transformer T2 and coupling capacitor C5. The secondary winding of the transformer is in two portions so poled that when coupling occurs through the lower half portion connected to diode CR4, the feedback is negative, and when it occurs through the upper half portion connected to diode CR3, the feedback is positive. In the former case, transistor Q6 will remain stable whereas in the latter case it will go into oscillation as a blocking oscillator. If the trip voltage determined from the reference voltage and applied to diode CR4 is higher than the signal voltage applied to CR3, conduction will take place through CR4 but not through CR3. Since CR4 is forward biased, it provides a low impedance to A.C. signals, while CR3, being reverse biased presents a high impedance path. Therefore feedback from collector to base of transistor Q6 is negative and no oscillations occur. However if the signal voltage exceeds the trip voltage, then conduction takes place through CR3 and not through CR4. Since CR3 is now forward biased, it provides the low impedance path, feedback is positive and transistor Q6 goes into oscillation.

The A.C. output of the blocking oscillator is applied to a peak-to-peak sensing circuit comprising capacitor C7, diode CR6 poled for positive conduction from ground, and resistor R18 connected to the negative supply, plus transistor Q8, resistor R19, and capacitor C8. The junction of C7, CR6 and R18 is connected to the base of transistor Q8 which, by reason of its emitter resistor R19, serves as an emitter follower in addition to operating as a rectifier. Therefore when blocking oscillator Q6 starts to oscillate, the voltage across resistor R19 and capacitor C8 changes abruptly from a negative to a positive value. The function of capacitor C8 is to hold the D.C. output and bypass the A.C. component.

Transistors Q9 and Q10 with resistors R20, R21, R22, R23 and collector to base cross-coupling capacitors C9 and C10 form a low frequency multivibrator. Normally Q10 is conducting heavily but Q9 is not conducting because it has no collector voltage, and the multivibrator is quiescent. When the blocking oscillator goes into oscillation, positive voltage is supplied by emitter follower Q8 to the collector of transistor Q9. The multivibrator then goes into oscillation causing a 10 cycle per second square wave to appear at the collector of transistor Q10.

The 10 c.p.s. square wave from the multivibrator is applied through resistor R24 to the base of transistor Q1 in the gate control circuit, and turns Q1 alternatively full on and full off. The signal output of Q1 is developed across collector resistor R25 and is coupled by resistor R26 to the base of transistor Q2. This causes Q2 to be turned alternately off and on at .05 second intervals (corresponding to 10 c.p.s.), so that the secondary of transformer T3 is alternately open and short circuited. As a result, the stylus of the event recorder across which the primary of transformer T3 is connected writes a dotted line. Prior to the operation of the blocking oscillator, the multivibrator was not functioning and Q10 was conducting heavily. As a result, the collector voltage of Q10 was low, causing Q1 to be cut off and Q2 to be full on. The secondary of transformer T3 was thereby effectively short-circuited so that the stylus did not write; this is the preferred mode for indicating absence of an input signal. It will be seen that transistor Q1 is in effect a phase inverter.

The high range comparator oscillator comprises transistor Q5 connected as a blocking oscillator with transformer T1 included in its feedback loop, the circuitry also including resistors R2, R3, R4, R5 and capacitors C1 and C2. The trip voltage, determined from the reference voltage by the setting of potentiometer R1, is applied directly to diode CR2 connected to the lower end of the secondary of transformer T1. The input signal voltage is applied directly to diode CR1 connected to the upper end of the secondary of transformer T1, capacitor C11 serving to bypass to ground any oscillations from the blocking oscillator. Because of the wider tolerances permissible in connection with the high range trip point, emitter followers (like Q4 and Q3) are not needed at the input.

The mode of operation of the high range comparator oscillator is similar to that of the low range unit. When the trip voltage is higher than the signal voltage, diode CR2 conducts, the feedback is negative and no oscillations occur. When the signal voltage exceeds the trip voltage, diode CR1 conducts, the feedback is positive, and blocking oscillator Q5 goes into oscillation. The oscillations are sensed by a second peak-to-peak circuit comprising capacitor C3, diode CR5 and resistor R6 which is followed by an emitter follower circuit comprising transistor Q7, resistor R7 and capacitor C4. As a result, when blocking oscillator Q5 starts to oscillate, the voltage across capacitor C4 changes abruptly from a negative to a positive value. This voltage is coupled through resistor R8 to the base of transistor Q1, effectively overriding the square wave signal from transistor Q10 of the multivibrator. Transistor Q1 is thereby turned full on, Q2 is turned full off, and the secondary of transformer T3 is continuously open-circuited so that the stylus writes a solid line.

With regard to the low range comparator oscillator, it may be noted that transistor Q3 can function as an emitter follower only so long as the input signal voltage is lower than the positive supply voltage +V, which, in this preferred embodiment is 14 volts. Under these conditions, the input current is low. However when the input signal voltage exceeds the positive supply voltage, transistor Q3 ceases to function as an emitter follower and the input current is then effectively limited by resistor R12 only. Accordingly, resistor R12 is selected to provide sufficient input impedance to limit the input current to an acceptable level, and the accuracy of the low level comparator is not affected within its working range. Diode CR7 prevents current flow from the input signal source to the voltage supply +V when the input signal voltage exceeds +V, and capacitor C12 serves to bypass the oscillations from blocking oscillator Q6 under these conditions.

The monitor control circuit according to this preferred embodiment of the invention may be constructed as a module consisting of a plug-in printed circuit board approximately 5 x 3 inches in size with all components mounted thereon. The trip voltage points are readily adjustable, independently, by means of subminiature multi-turn potentiometers. As many of these modules as desired may be used with a suitable even recorder to achieve the desired accuracy and versatility in the selected channels. In these channels, the occurrence of an input signal exceeding the first trip voltage will be accurately indicated by the writing of a dotted line, and one exceeding the second trip voltage, by a solid line. The trip voltages may be independently adjusted, that is preset, as desired in any channel. Other channels may of course be used in the conventional way to indicate ON-OFF conditions only by solid line writing.

The preferred embodiment which has been described and illustrated uses two comparators. Obviously a single comparator may be used where such suffices, and the circuit will then accurately indicate when a single trip voltage has been exceeded. Moreover, with suitable modifications, more than two comparators may be provided. Response may then be had at several trip points and same recorded by using multivibrators providing appropriate markings, as by varying the dot spacing. The electron discharge devices need not be semi-conductors or transistors, but may take other forms such as conventional electron tubes by appropriate modification of the circuitry. Other kinds of event recorders may be used than that which has been specifically described provided they are adaptable to electric control.

The specific embodiment of the invention which has been described is intended as exemplary and not in order to limit the invention thereto since many modifications are possible within the principles which have been outlined and will readily occur to competent designers. The scope of the invention is accordingly to be determined by the appended claims.

What we claim as new and desire to secure by Letters Patent of the United States is:

1. A monitor control circuit for an event recorder wherein writing is allowed or prevented by open circuiting or short circuiting a control circuit, comprising a first comparator providing an output when an input signal voltage exceeds a first preset trip voltage, a second comparator providing an output when the input signal voltage exceeds a second preset trip voltage, means responsive to the output of said first comparator open circuiting said control circuit according to one pattern of time-variation to allow writing to occur in one form, and means responsive to the output of said second comparator open circuiting said control circuit according to another pattern of time-variation to allow writing to occur in another form.

2. A monitor control circuit for an event recorder wherein writing is allowed or prevented by open circuiting or short circuiting a control circuit, comprising a first comparator providing an output when an input signal voltage exceeds a first preset trip voltage, a second comparator providing an output when the input signal voltage exceeds a second preset trip voltage, means responsive to the output of said first comparator intermittently open circuiting said control circuit to allow dotted line writing to occur, and means responsive to the output of said second comparator continuously open circuiting said control circuit to allow solid line writing to occur.

3. A monitor control circuit for an event recorder wherein writing is allowed or prevented by open circuiting or short circuiting a control circuit comprising a comparator oscillator including a blocking oscillator having a feedback loop wherein feedback is negative when a preset trip voltage exceeds an input signal voltage, and positive when the input signal voltage exceeds the trip voltage whereby said blocking oscillator goes into oscillation, and means responsive to said oscillations including a gate control circuit effectively open circuiting said control circuit to allow writing to occur.

4. A monitor control circuit for an event recorder wherein writing is allowed or preveted by effectively open circuiting or short circuiting a control circuit comprising a low range comparator oscillator including a blocking oscillator having a feedback loop wherein feedback is negative when a first preset trip voltage exceeds an input signal voltage, and positive when the input signal voltage exceeds the trip voltage whereby said blocking oscillator goes into oscillation, and means responsive to said oscillations including a multivibrator and a gate control circuit intermittently open circuiting said control circuit to cause dotted writing to occur when the input signal voltage exceeds said first trip voltage, and a high range comparator oscillator which goes into oscillation when the input signal exceeds a second preset trip voltage, and means responsive to said latter oscillations causing said gate control circuit to continuously open circuit said control winding to cause solid writing to occur.

5. A monitor control circuit for an event recorder wherein events are recorded on a moving electrosensitive paper chart by a writing circuit supplying voltage pulses to a conductive stylus in contact with said paper and wherein writing is prevented by effectively short circuiting the secondary of a control transformer having a primary shunted across said writing circuit, comprising a comparator oscillator including a blocking oscillator having a feedback loop wherein feedback is negative when a preset trip voltage exceeds an input signal voltage, and positive when the input signal voltage exceeds the trip voltage whereby said blocking oscillator goes into oscillation, a sensing circuit responsive to said oscillations, a low frequency multivibrator controlled by said sensing circuit, a gate control circuit receiving the output of said multivibrator and caused thereby to open circuit intermittently the secondary winding of said control transformer whereby said stylus writes a dotted line, and means causing said gate control circuit to open circuit continuously the secondary winding of said control transformer when the input signal voltage attains a high level whereby said stylus writes a solid line.

6. A monitor control circuit for an event recorder wherein events are recorded on a moving electrosensitive paper chart by a writing circuit supplying voltage pulses to a conductive stylus in contact with said paper and wherein writing is prevented by effectively short circuiting the secondary of a control transformer having a primary shunted across said writing circuit, comprising a low range comparator oscillator including a blocking oscillator having a feedback loop wherein feedback is negative when a preset trip voltage exceeds an input signal voltage, and positive when the input signal voltage exceeds the trip voltage whereby said blocking oscillator goes into oscillation, a sensing circuit responsive to said oscillations, a low frequency multivibrator controlled by said sensing circuit, a gate control circuit receiving the output of said multivibrator and caused thereby to open circuit intermittently the secondary winding of said control transformer whereby said stylus writes a dotted line, and a high range comparator oscillator likewise including a blocking oscillator with feedback loop which goes into oscillation when the input signal voltage exceeds a higher preset trip voltage, and a sensing circuit responsive to said latter oscillations and providing to said gate control circuit a steady signal overriding that from said multivibrator whereby said stylus writes a solid line.

7. A monitor control for an event recorder wherein events are recorded by a writing circuit controlled by effectively short circuiting or open circuiting a control circuit, comprising: a comparator including a blocking oscillator comprising an electron discharge device provided with a feedback loop between its output and input, said feedback loop comprising a transformer having a primary winding connected to the output of said electron discharge device and a secondary winding connected to the input of said electron discharge device, said secondary winding being in two portions, one portion poled for positive feedback and the other portion poled for negative feedback; a pair of diodes, one connected to each portion; circuit means applying the input signal voltage through one diode to the positive feedback portion and a preset trip voltage through the other diode to the negative feedback portion, whereby when the input signal voltage exceeds the preset trip voltage said one diode conducts, positive feedback occurs and said blocking oscillator goes into oscillation, but when said input signal voltage is less than said preset trip voltage said other diode conducts, negative feedback occurs, and said blocking oscillator remains stable; a sensing circuit producing a D.C. voltage in response to the oscillations of said blocking oscillator; and means including a gate control responsive to said D.C. voltage for open circuiting said control circuit according to a predetermined pattern to produce writing in a distinctive form.

8. A monitor control for an event recorder wherein events are recorded on a moving electrosensitive paper chart by a writing circuit supplying voltage pulses to a conductive stylus in contact with said paper and wherein writing is controlled by effectively short circuiting or open circuiting a control circuit, comprising: a comparator including a blocking oscillator comprising a transistor provided with a feedback loop between its output and input, said feedback loop comprising a transformer having a primary winding connected in the collector circuit of said transistor and a secondary winding connected in the base circuit of said transistor, said secondary winding being in two portions, one portion poled for positive feedback and the other portion poled for negative feedback; a pair of diodes, one connected to each portion; circuit means applying the input signal voltage through one diode to the positive feedback portion and a preset trip voltage through the other diode to the negative feedback portion, whereby when the input signal voltage exceeds the preset trip voltage said one diode conducts, positive feedback occurs and said blocking oscillator goes into oscillation, but when said input signal voltage is less than said preset trip voltage said other diode conducts, negative feedback occurs, and said blocking oscillator remains stable; a sensing circuit producing a D.C. voltage in response to the oscillations of said blocking oscillator; and means including a gate control responsive to said D.C. voltage for effectively open circuiting said control circuit according to a predetermined pattern to allow said stylus to write in a distinctive form.

9. A monitor control for an event recorder wherein events are recorded by a writing circuit controlled by effectively short circuiting or open circuiting the secondary of a control transformer having a primary shunted across said writing circuit, comprising: a low range comparator oscillator including a blocking oscillator comprising an electron discharge device provided with a feedback loop between its output and input, said feedback loop comprising a transformer having a primary winding connected to the output of said electron discharge device and a secondary winding connected to the input of said electron discharge device, said secondary winding being in two portions, one portion poled for positive feedback and the other portion poled for negative feedback; a pair of diodes, one connected to each portion; circuit means applying the input signal voltage through one diode to the positive feedback portion and a preset trip voltage through the other diode to the negative feedback portion, whereby when the input signal voltage exceeds the preset trip voltage said one diode conducts, positive feedback occurs and said blocking oscillator goes into oscillation, but when said input signal voltage is less than said preset trip voltage said other diode conducts, negative feedback occurs, and said blocking oscillator remains stable; a sensing circuit producing a D.C. voltage in response to the oscillations of said blocking oscillator; a low frequency multivibrator controlled by said sensing circuit and producing a square wave output upon the occurrence of said D.C. voltage; a gate control circuit actuated by said square wave output to open circuit intermittently the secondary of said control transformer whereby said writing circuit produces a dotted line; and a high range comparator oscillator similar to said low range comparator oscillator but which goes into oscillation when the input signal voltage exceeds a higher preset trip voltage; a sensing circuit producing a D.C. voltage in response to said latter oscillations; and connections supplying said latter D.C. voltage to said gate control circuit to override said square wave output and open circuit continuously the secondary of said control transformer whereby said writing circuit produces a solid line.

10. A monitor control for an event recorder wherein events are recorded on a moving electrosensitive paper chart by a writing circuit supplying voltage pulses to a conductive stylus in contact with said paper and wherein writing is prevented by effectively short circuiting the secondary of a control transformer having a primary shunted across said writing circuit, comprising: a low range comparator oscillator including a blocking oscillator comprising a transistor provided with a feedback loop between its output and input, said feedback loop comprising a transformer having a primary winding connected in the collector circuit of said transistor and a secondary winding connected in the base circuit of said transistor, said secondary winding being in two portions, one portion poled for positive feedback and the other portion poled for negative feedback; a pair of diodes, one connected to each portion; circuit means applying the input signal voltage through one diode to the positive feedback portion and a preset trip voltage through the other diode to the negative feedback portion, whereby when the input signal voltage exceeds the preset trip voltage said one diode conducts, positive feedback occurs and said blocking oscillator goes into oscillation, but when said input signal voltage is less than said preset trip voltage said other diode conducts, negative feedback occurs, and said blocking oscillator remains stable; a sensing circuit producing a D.C voltage in response to the oscillations of said blocking oscillator; a low frequency multivibrator controlled by said sensing circuit and producing a square wave output upon the occurrence of said D.C. voltage; a gate control circuit actuated by said square wave output to open circuit intermittently the secondary of said control transformer whereby said stylus writes a dotted line; and a high range comparator oscillator similar to said low range comparator oscillator but which goes into oscillation when the input signal voltage exceeds a higher preset trip voltage; a sensing circuit producing a D.C. voltage in response to said latter oscillations; and connections supplying said latter D.C. voltage to said gate control circuit to override said square wave output and open circuit continuously the secondary of said control transformer whereby said stylus writes a solid line.

11. In combination: an event recorder wherein events are recorded on a moving electrosensitive paper chart by a writing circuit supplying voltage pulses to a conductive stylus in contact with said paper and wherein writing is prevented by effectively short circuiting the secondary of a control transformer having a primary shunted across said writing circuit; a low range comparator oscillator including a blocking oscillator comprising an electron discharge device provided with a feedback loop between its output and input, said feedback loop comprising a transformer having a primary winding connected to the output of said electron discharge device and a secondary winding connected to the input of said electron discharge device, said secondary winding being in two portions, one portion poled for positive feedback and the other portion poled for negative feedback; a pair of diodes, one connected to each portion; circuit means applying the input signal voltage through one diode to the positive feedback portion and a preset trip voltage through the other diode to the negative feedback portion, whereby when the input signal voltage exceeds the preset trip voltage said one diode conducts, positive feedback occurs and said blocking oscillator goes into oscillation, but when said input signal voltage is less than said preset trip voltage said other diode conducts, negative feedback occurs, and said blocking oscillator remains stable; a sensing circuit producing a D.C. voltage in response to the oscillations of said blocking oscillator; a low frequency multivibrator controlled by said sensing circuit and producing a square wave output upon the occurrence of said D.C. voltage; a gate control circuit actuated by said square wave output to open circuit intermittently the secondary of said control transformer whereby said stylus writes a dotted line; and a high range comparator oscillator similar to said low range comparator oscillator but which goes into oscillation when the input signal voltage exceeds a higher preset trip voltage; a sensing circuit producing a D.C. voltage in response to said latter oscillations; and connections supplying said latter D.C. voltage to said gate control circuit to override said square wave output and open circuit continuously the secondary of said control transformer whereby said stylus writes a solid line.

12. A monitor control circuit for an event recorder wherein writing is allowed or prevented by open circuiting or short circuiting a control circuit, comprising a plurality of comparators, each comparator providing an output only when an input signal voltage exceeds a trip voltage preset at a different level for each comparator, and means, one for each comparator, responsive to its output to open said control circuit according to a pattern of time-variation which is different for each comparator to allow writing to occur in different form according to the level of the input signal voltage.

References Cited in the file of this patent
UNITED STATES PATENTS 2,639,209   Gamarekian _____ May 19, 1953